United States Patent
Allouche et al.

(10) Patent No.: US 11,979,421 B2
(45) Date of Patent: May 7, 2024

(54) CLUSTER-BASED OUTLIER SCORING OF NETWORK TRAFFIC

(71) Applicant: International Business Machines Corporation, Armonk, NY (US)

(72) Inventors: Yair Allouche, Dvira (IL); Aviad Cohen, Meitar (IL); Ravid Sagy, Beit Yizhack (IL); Ofer Haim Biller, Midreshet Ben-Gurion (IL); Eitan Daniel Farchi, Pardes Hanna-Karkur (IL)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/566,825

(22) Filed: Dec. 31, 2021

(65) Prior Publication Data
US 2023/0216870 A1    Jul. 6, 2023

(51) Int. Cl.
*H04L 9/40*    (2022.01)
*G06F 9/48*    (2006.01)

(52) U.S. Cl.
CPC ........ *H04L 63/1425* (2013.01); *G06F 9/4881* (2013.01)

(58) Field of Classification Search
CPC ............. H04L 63/1425; H04L 63/1433; H04L 63/1441; H04L 9/40; G06F 9/4881; G06N 20/00; G06N 20/10
See application file for complete search history.

(56) References Cited

U.S. PATENT DOCUMENTS

| | | | |
|---|---|---|---|
| 8,682,812 B1 * | 3/2014 | Ranjan | H04L 43/028 706/12 |
| 10,659,333 B2 | 5/2020 | Sartran et al. | |
| 2003/0176931 A1 * | 9/2003 | Pednault | G06N 7/01 700/44 |

(Continued)

FOREIGN PATENT DOCUMENTS

| | | |
|---|---|---|
| CN | 109818971 A | 5/2019 |
| CN | 112434298 B | 7/2021 |

OTHER PUBLICATIONS

Chan et al., "Learning Rules and Clusters for Anomaly Detection in Network Traffic", In Book: Managing Cyber Threats, pp. 81-99, Published Jan. 2005, 21 pages.

(Continued)

*Primary Examiner* — Quazi Farooqui
(74) *Attorney, Agent, or Firm* — Kristofer Haggerty (57) ABSTRACT

In some examples, a system for decorating network traffic flows with outlier scores includes a processor and a memory device to store traffic flows received from a network. The processor is configured to receive a set of traffic flows from the memory device and generate a tree model to split the traffic flows into clusters of traffic flows. Each cluster corresponds with a leaf of the tree model. The processor is further configured to generate machine learning models for each of the clusters of traffic flows separately. For a new traffic flow, the processor is configured to identify a specific one of the machine learning models that corresponds with the new traffic flow, compute an outlier score for the new traffic flow using the identified specific one of the machine learning models, and decorate the new traffic flow with the outlier score.

17 Claims, 7 Drawing Sheets

(56) References Cited

U.S. PATENT DOCUMENTS

2015/0304349 A1* 10/2015 Bernstein ............ H04L 63/1425
726/22
2020/0334228 A1* 10/2020 Matyska ............ G06Q 30/0185

OTHER PUBLICATIONS

Dias et al., "Go With the Flow: Clustering Dynamically-Defined NetFlow Features for Network Intrusion Detection with DYNIDS", 2020 IEEE 19th International Symposium on Network Computing and Applications (NCA), Jan. 5, 2021, 10 pages.

Elmogy et al., "OFCOD: On the Fly Clustering Based Outlier Detection Framework", mdpi.com, Dec. 30, 2020, 20 pages.

Author Unknown, "Comparing anomaly detection algorithms for outlier detection on toy datasets", Scikit Learn, Accessed: Nov. 1, 2023, https://scikit-learn.org/stable/auto_examples/miscellaneous/plot_anomaly_comparison.html, 4 pages.

Berezinski et al., "Network Anomaly Detection Using Parameterized Entropy", HAL Open science, 13th IFIP International Conference on Computer Information Systems and Industrial Management (CISIM), Nov. 2014, https://inria.hal.science/hal-01405630v1/document, 15 pages.

Claise, "Cisco Systems NetFlow Services Export Version 9", Network Working Group, Cisco Systems, Oct. 2004, https://www.ietf.org/rfc/rfc3954.txt, 29 pages.

Goldstein et al. "Histogram-based Outlier Score (HBOS): A fast Unsupervised Anomaly Detection Algorithm", KI-2012: Poster and Demo Track (2012), Sep. 2012, https://www.goldiges.de/publications/HBOS-KI-2012.pdf, 5 pages.

Hofstede et al., "Flow Monitoring Explained: From Packet Capture to Data Analysis With NetFlow and IPFIX", IEEE Communications Surveys & Tutorials, vol. 16, No. 4, Fourth Quarter 2014, https://ieeexplore.ieee.org/stamp/stamp.jsp?tp=&arnumber=6814316, pp. 2037-2064.

Iglesias et al., "Analysis of network traffic features for anomaly detection", Mach Learn (2015) 101, Springer, DOI 10.1007/s10994-014-5473-9, pp. 59-84.

Johnson et al., "Network Anomaly Detection Using Autonomous System Flow Aggregates," Globecom 2014—Communication and Information System Security Symposium, IEEE, Dec. 8-12, 2014, https://ieeexplore.ieee.org/document/7036864, pp. 544-550.

Kanda et al., "A Flow Analysis for Mining Traffic Anomalies", 2010 IEEE International Conference on Communications, May 23-27, 2010, https://ieeexplore.ieee.org/document/5502463, 5 pages.

Kim et al., Packetscore: Statistics-based Overload Control against Distributed Denial-of-Service Attacks, IEEE Infocom 2004, Nov. 22, 2004, https://ieeexplore.ieee.org/document/1354679, 11 pages.

PyOD, "Welcome to PyOD documentation!", pyod 1.1.1 documentation., Accessed: Nov. 1, 2023, https://pyod.readthedocs.io/en/latest/, 21 pages.

Quittek, "Requirements for IP Flow Information Export (IPFIX)", Network Working Group, Swinburne University, Oct. 2004, https://www.ietf.org/rfc/rfc3917.txt, 29 pages.

Tian et al., "Mining network traffic anomaly based on adjustable piecewise entropy", 2015 IEEE 23rd International Symposium on Quality of Service (IWQoS), 2015, https://ieeexplore.ieee.org/stamp/stamp.jsp?tp=&arnumber=7404749, 10 pages.

* cited by examiner

CLUSTER-BASED OUTLIER SCORING OF NETWORK TRAFFIC

BACKGROUND

The present disclosure relates to techniques for detecting malicious activity such as cyber-attacks in enterprise networks. The vast majority of cyber-attacks traverse the network in some way. Therefore, analysis of network traffic can help enterprises detect suspicious activities and breaches which might be missed with other approaches. Current solutions for network monitoring employ the use of rule-based approaches to detect suspicious network activity. Unfortunately, with the increasing sophistication of threat actors and their ability to imitate normal network behavior, the effectiveness of rule-based approaches is rapidly diminishing and may not be effective at detecting some types of attacks. Responding to this gap, a new field called Network Traffic Analysis (NTA) has emerged. NTA solutions offer a combination of machine learning, advanced analytics, and rule engines to detect suspicious activities on enterprise networks. This hybrid approach allows the detection of known along with unknown zero-day threats.

SUMMARY

According to an embodiment described herein, a system for detect anomalies by decorating network traffic flows with outlier scores is disclosed. An example system includes a processor and a memory device to store traffic flows received from a network. The processor is configured to receive a set of traffic flows from the memory device and generate a tree model to split the traffic flows into clusters of traffic flows. Each cluster corresponds with a leaf of the tree model. The processor is further configured to generate machine learning models for each of the clusters of traffic flows separately. For a new traffic flow, the processor is configured to identify a specific one of the machine learning models that corresponds with the new traffic flow, compute an outlier score for the new traffic flow using the identified specific one of the machine learning models, and decorate the new traffic flow with the outlier score.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure describes techniques for detecting malicious activity in enterprise networks through Network Traffic Analysis (NTA). One of the main challenges in network traffic analysis is scale. Even in a mid-size organization multi-gigabit of data is traveling across the organization's network. In order to deal with this huge amount of data, a processing layer can be positioned on the network edge to apply large-scale flow level stream analytics. The goal of this analytic is to calculate for each flow an outlier score reflecting the likelihood of the occurrence of this flow in the given network status. By decorating each flow with an outlier score on the network edge, any backend processing applied on this data can leverage this outlier score in order to focus its processing for better dealing with traffic scale.

Outlier score approaches for network data may be based on a statistical model of network features. However, building a statistical model for network traffic is challenging due to network traffic diversity. For example, a typical network may be expected to encounter varying types of network traffic such as Hypertext Transfer Protocol (HTTP), Domain Name System (DNS), Transmission Control Protocol (TCP), User Datagram Protocol (UDP), Secure Shell (SSH), Skype and others. Each of these types of traffic may be highly different from one another. In addition, the network dataset tends to be unbalanced. If the flow dataset is generated by uniformly sampling an organization communication network it will be dominant in some specific traffic types (e.g., DNS traffic and HTTP traffic) but will contain a small representation of more unique traffics (e.g., SSH traffic). This will result in a redundant dataset for some types of traffic but too small a dataset for others.

To address this challenge, the anomaly detection algorithm described herein applies a divide and conquer approach for modeling network traffic. In accordance with present techniques, the network traffic flows are divided into hierarchical clusters, such that each cluster will contain all the flows that share the same combination of pre-chosen categorical properties (e.g., protocol, port, etc.). A dataset can be pulled for each cluster proactively until the required dataset size is reached or until the number of pulling attempts reach some predefined limit. For each cluster, a machine learning (ML) model can be built. Since each cluster of flows is relatively homogenous compared to the overall network traffic, the model built for each cluster will be tighter, thus enable better detection of anomalies.

In order for the network model to continue predicting accurately over time, the data that it is making predictions on must have a similar distribution as the data on which the model was trained. However, since the network dynamic is continuously changing, feature distributions will drift over time. Accordingly, embodiments of the anomaly detection process described herein continuously adjust the generated models to adapt to changes in the current network traffic.

Figure 1:
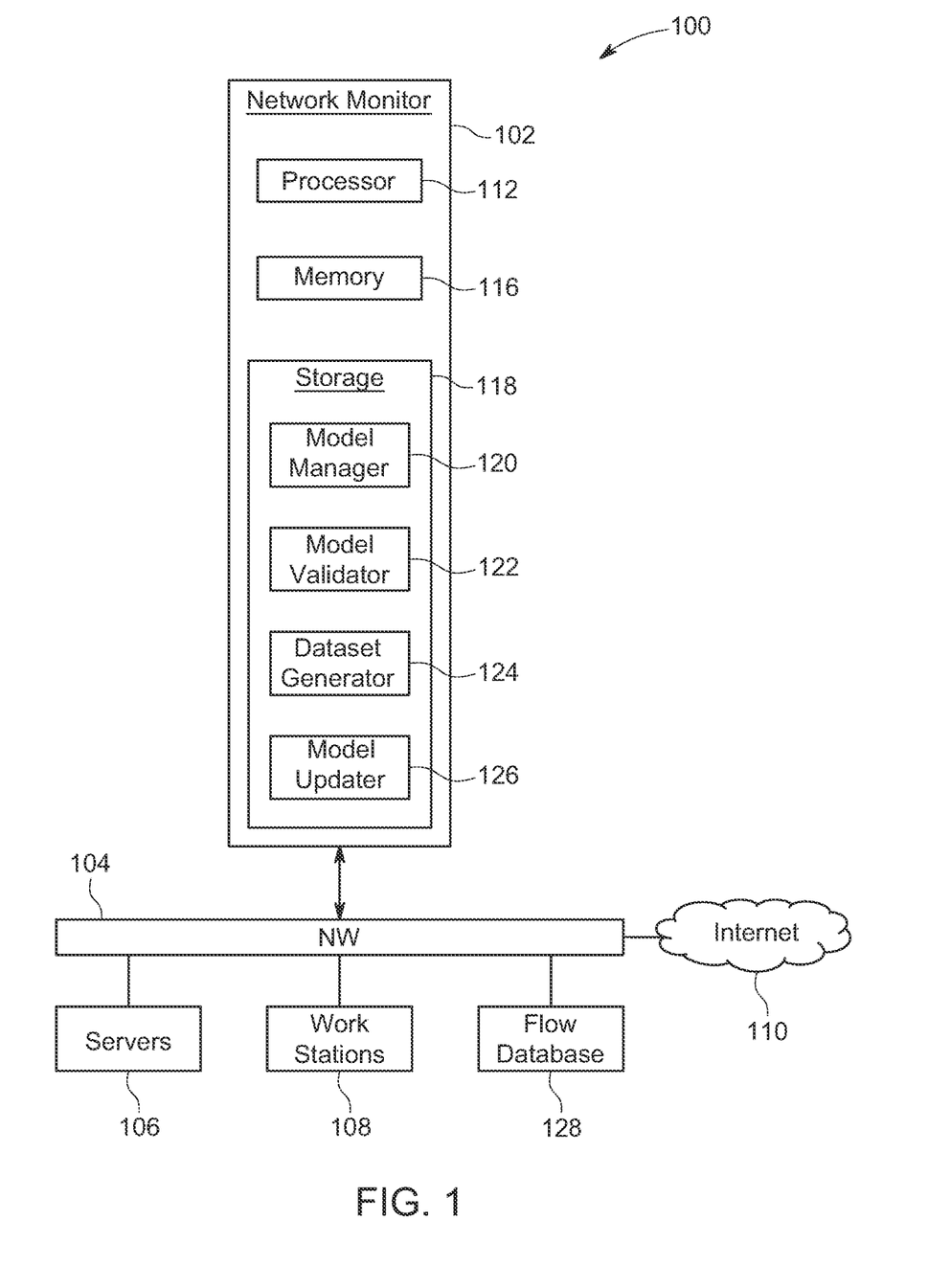
FIG. 1 depicts an example computing device that is configured to monitor network traffic for anomalies in accordance with embodiments.

With reference now to FIG. 1, an example computing device is depicted that is configured to monitor network traffic for anomalies in accordance with embodiments. The system includes a network monitor 102 coupled to a network 104. The network 104 may be any suitable type of network such as a local area network (LAN) of a business enterprise or other organization. Various computing devices can be coupled to the network including one or more servers 106, workstations 108, and others. The network may also be coupled to the Internet 110. The network 104 can include a plurality of routers and switches for routing traffic through the network between the servers 106, workstations 108, and the internet 110, for example.

The network monitor 102 may include a processor 102 that is adapted to execute stored instructions, and a memory device 104 to provide temporary memory space for processing of said instructions during operation. The processor 102 can be a single-core processor, multi-core processor, or any number of other configurations. The memory 104 can include random access memory (RAM), read only memory, flash memory, or any other suitable memory systems.

The network monitor 102 is configured to receive network traffic flows from the network 104. Traffic flows may be received through one or more devices in the network such as one or more routers or switches in the network. Traffic flows may be streamed directly from the network 104 to the network monitor 102 or stored to the flow database 128 and retrieved by the network monitor 102 as a dataset of traffic flows. The network traffic flows may be formatted according to any suitable format, including Internet Protocol Flow Information Export (IPFIX), for example.

The network monitor also includes a storage device 106 that stores files, data, and programming code for implementation of the disclosed techniques. The storage device can include a model manager 120 and a model validator 122. As described in further detail below, the model manager 120 is configured to receive a network traffic flow dataset and generate a tree model, T, which includes several clusters. The model manager 120 segments the traffic flow dataset into the various clusters and generates separate machine learning (ML) cluster models, $\{M_1, M_2, \ldots, M_n\}$, for each of the clusters. Together, the tree model and the ML cluster models represent the network model that is used to detect anomalous network traffic flows.

The model validator 122 receives an input stream (or dataset) of the traffic flow from the network and generates an output stream of traffic flows, which are decorated or labeled with a flow score using the tree model, T, and cluster models, $\{M_1, M_2, \ldots, M_n\}$, provided by the model manager. The outlier score for a flow can be calculated by combining the cluster score and the flow score within the cluster model. The outlier score represents the distance between a flow and its cluster base line. For example, if a cluster is representing HTTP flows, the outlier score will represent the distance between this HTTP flow from all other HTTP flows. The outlier score may be defined using the following function:

$$S(f)=f(p(c),p(f/c)) \quad \text{(eq. 1)}$$

The dataset generator 124 generates the traffic flow dataset that is used by the model manager to create and/or update the tree model and create the ML cluster models. The dataset generator 124 can be used to achieve an unbiased dataset that is representative of the network traffic. The model updater 126 is configured to update the network model to respond to continuously changing network traffic and keep anomaly predictions accurate over time. The processes performed by the above components is described in greater detail below in relation to FIGS. 2-6.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the model manager 120, model validator 122, dataset generator 124, and model updater 126 are partially, or entirely, implemented in hardware such as the processor 102. For example, the functionality may be implemented with an application specific integrated circuit, logic implemented in an embedded controller, or in logic implemented in the processor 102, among others. The term logic, as referred to herein, can include any suitable hardware (e.g., a processor, among others), software (e.g., an application, among others), firmware, or any suitable combination of hardware, software, and firmware.

Figure 2:
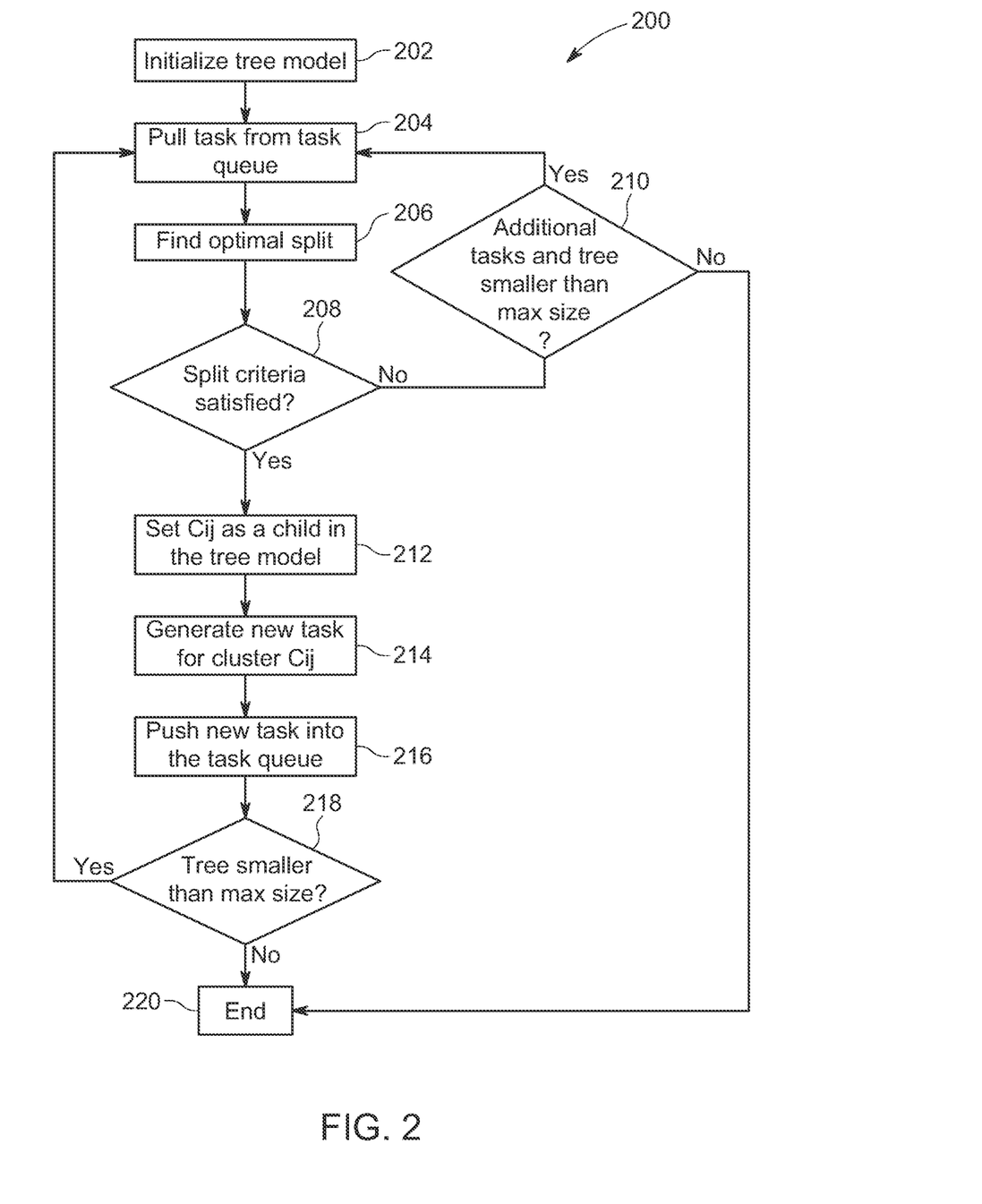
FIG. 2 is a process flow diagram of a method of clustering data flows in accordance with embodiments.

FIG. 2 is a process flow diagram of a method of clustering data flows in accordance with embodiments. The clustering method 200 uses a hierarchical clustering algorithm that is performed by the model manager 120 of FIG. 1. Hierarchical clustering requires a measure of dissimilarity between sets of observations. In most methods of hierarchical clustering, this is achieved by the use of a distance measure/metric between pairs of observations. However, as many network flow features are categorical features (e.g., IP address, ports, protocols), this measure of dissimilarity is inapplicable.

In order to address this challenge, the model manager's hierarchical clustering algorithm uses the objective function shown in equation 3 below for defining an optimal split measure for optimal clustering. A valid clustering solution in accordance with embodiments is any clustering solution that satisfies the following two conditions: (i) the clustering solution represents all flows in the dataset; and (ii) each flow in the data set will be associated with a single cluster in the clustering solution. This is described formally by equations 2 below, which state that, given a flow dataset F, a valid clustering solution $S=\{C_1, C_2, \ldots, C_n\}$ must satisfy the following two conditions:

$$U_{C_i \in S} C_i = F \ \& \ C_i \cap C_j = \emptyset \text{ for any } C_i, C_j \in S \quad \text{(eq. 2)}$$

The cost function of a valid clustering solution $S=\{C_1, C_2, \ldots, C_n\}$ is given by:

$$\text{Cost}(S) = \Sigma_{C \in S} A(f \in C) + k|S| \quad \text{(eq. 3)}$$

In equation 3, function A is the cost function of a given cluster designed to prioritize clusters with the minimal disorder in the features of cluster flows. For example, function A can be defined as the entropy of all flows in cluster C. The model size coefficient k is a hyperparameter used to balance between performance and accuracy. Low penalty yields a high number of clusters, therefore, higher accuracy and lower performance. High penalty yields better performance but lower accuracy.

The model manager applies a top-down hierarchical clustering algorithm in which all observations start in one cluster (the root of the hierarchical clustering tree), and splits are performed recursively while moving down the hierarchy. The splits are determined in a greedy manner, that is, the valid split that maximizes the gain of the objective function defined above.

The clustering algorithm described herein uses the following notations. The function Filter(C, v) returns the cluster generated by applying filter v on cluster C. The filter v may be on a numeric feature, such as number of source packets for example. However, in some embodiments, the filter v is a categorical filter that describes some non-quantitative feature of network traffic, such as destination port, communication protocol, IP address, whether the flow is local-to-local, remote-to-local, local-to-remote, and others. For example, if v=destination port ∈ {80,433}, then the resulting cluster will consist of all flows in C with a destination port equal to either 80 or 433. $V_{i,f}$ denotes all the valid clustering of cluster $C_i$ using feature f. For example, the valid clustering $v_{i,f}$={{80,433}, {20,21}, {53}, {other}} on destination port feature will result with 4 clusters. The first cluster will consist of all flows in C with destination port∈ {80,433}, the second cluster will consist of all flows in C with destination port∈ {20,21}, the third cluster will consist of all flows in C with destination port∈ {53}. The {other} filter represents the cluster residual, that is, all flows in C with destination port∈ ≠{80, 433, 20, 21, 53}. Finally, $v_{i,f}^k$ is the k entry in the filter $v_{i,f}$ which generates the cluster $C_{i,k}$, i.e., $C_{i,k}$=Filter($C_i$, $v_{i,f}^k$).

Figure 3:
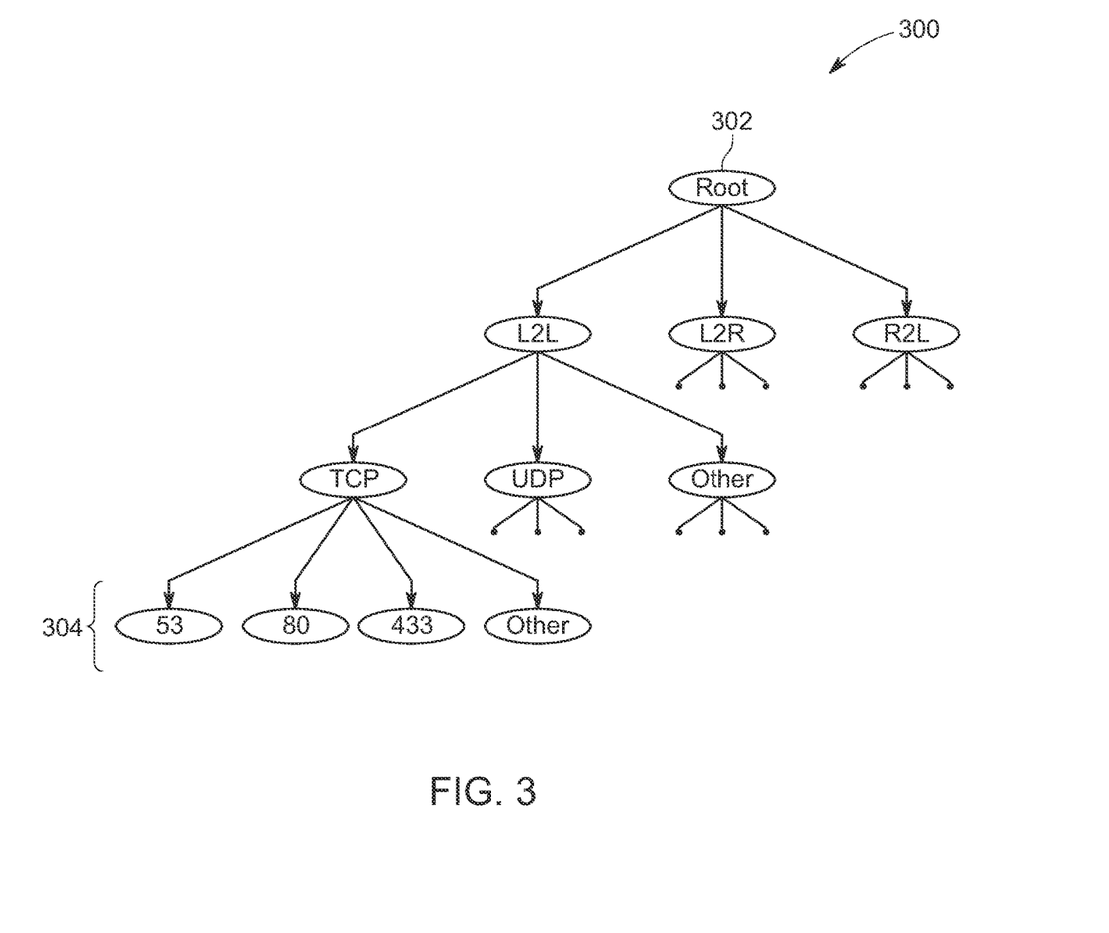
FIG. 3 shows an example of a tree mode in accordance with embodiments

The clustering algorithm uses two data structures, the tree model T and a task queue Q. The tree model T is the tree diagram representing the clustering hierarchy, an example of which is shown in FIG. 3. Q is a task priority queue that allows the algorithm to move in a greedy fusion over the clustering hierarchy. In addition, the use of tasks in a priority queue enables to parallelize the whole process using threads pulling tasks from the queue in parallel. Each task in the task priority queue consists of three fields:

1. Cluster filter v (i.e., C=Filter(F, v))
2. The set U, which represent the set of unset clustering features of cluster C (that is, features that are not set in the cluster filter v)
3. Task priority The hierarchical clustering algorithm in accordance with embodiments receives as input (1) a set of clustering features, denoted herein as U, (2) a dataset of network flows, denoted herein as F, where each flow contains the clustering features, and (3) parameters, denoted herein as P. Additionally, the variable max_tree_size represents the maximum number of nodes in the hierarchical clustering tree. The output of the clustering algorithm is the clustering solution $S_{opt}$={$C_1, C_2, \ldots, C_n$}.

The clustering algorithm begins at block 202, wherein the tree model is initialized. To initialize the tree model, the root cluster C, representing the entire data set F, is set as the tree root of the tree model T. Next, an initial task K of root cluster C is generated by setting the cluster filter as an empty filter, setting U with all the clustering tree features, and setting the cluster priority with the default max priority value. The initial task K is then pushed into the task queue Q. After the initialization stage, the processing stage begins and continues while the task queue Q is not empty and the tree model T size is smaller than a specified max tree size.

At block 204, a task is pulled from the task queue Q. The task pulled will be the task in the queue with the highest priority. Also at block 204, a traffic flow dataset may generated for the task using the dataset generation process described in relation to FIG. 5.

At block 206, the optimal split of the current cluster $C_i$ is determined. The optimal split will be the one that minimizes the cost function among any valid split of any unset feature of cluster $C_i$ according to the cost function defined in equation 3. More formally, the optimal split {$C_{i,1}, C_{i,2}, \ldots, C_{i,x}$} of cluster $C_i$ is given by:

$$\{C_{i,1}, C_{i,2}, \ldots, C_{i,x}\} = \min_{f \in U_i} \min_{v_{i,f}^j \in V_{i,f}} \text{Cost}(\{C_{i,j} : C_{i,j} = \text{Filter}(C_i, v_{i,f}^j)\})$$

In the above equation, $U_i$ is the set of $C_i$'s unset features, and $V_{i,f}$ is the set of all valid split of cluster $C_i$ on the feature f. Accordingly, the set {$C_{i,j}$:$C_{i,j}$=Filter($C_i$, $v_{i,f}^j$)} is the solution received by applying the valid split $V_{i,f}$ on cluster $C_i$.

At block 208, a determination is made regarding whether the specified split criteria is satisfied. The split criteria is satisfied if Cost({$C_i$})>Cost({$C_{i,1}, C_{i,2}, \ldots, C_{i,x}$})+k·x. If the split criteria is not satisfied, the current cluster $C_i$ is not split, and the process flow advances to block 210.

At block 210, a determination is made regarding whether there are additional tasks in the task queue and whether the current tree model is smaller than the max tree size. If there are no additional tasks or if the tree size is at the maximum, then the process flow advances to block 220 and the process ends. Otherwise, the process flow advances to block 212 and x new child nodes are added to the tree model below the current node. In other words, the parent node $C_i$ is split into x child nodes below $C_i$. The number of child nodes is denoted x. The processes describe in relation to blocks 212, 214, 216, and 218 may be applied in a loop for each new cluster from j=1 to x.

At block 212, the cluster $C_{i,j}$ is set as the j'st child of cluster $C_i$ in the three model T.

At block 214 new tasks are generated for each of the x new child nodes {$C_{i,1}, C_{i,2}, \ldots, C_{i,x}$}. To generate a new task for each cluster $C_{i,j}$∈{$C_{i,1}, C_{i,2}, \ldots, C_{i,x}$}, the cluster filter is set as the cluster filter of cluster $C_i$ plus the new cluster filter $v_j$, i.e., $C_{i,j}$ filter=$C_i$ filter & $v_{i,f,j}$. If $v_{i,f,j}$ is not "other", the feature f is removed from the unset feature set U. Next, the cluster priority is set based on a combination the cluster flow rate and the cluster cost Cost($C_{i,j}$).

At block 216, each new task is pushed into the task queue, Q. The process flow then advances to block 218.

At block 218, a determination is made regarding whether the current tree model is smaller than the max tree size. If it is, then the process flow returns to block 204 and new task is pulled. Otherwise, the process flow advances to block 220 and the process ends. The end result is the clustering solution $S_{opt}$, which includes only the leaves of the tree model T. An example tree model T is shown in FIG. 3.

Once the tree model has been generated, the model manager 120 generates an anomaly detection ML model for each cluster. The model manager 120 receives as the input the optimal clustering solution produced of n clusters ($S_{opt}$={$C_1, C_2, \ldots, C_n$}) and returns a set of cluster models: {$M_1, M_2, \ldots, M_n$} where $M_i$ is the cluster model of cluster $C_i$. The model manager 120 can leverage different, of-the-shelf, one-class algorithms for anomaly detection (e.g., by using the PyOD Python toolkit, or sklearn). Formally, let A. fit( ) and A. predict( ) be the training method and the score calculation method of the anomaly detection algorithm A. To generate the ML models, the model manager 120 can generate the cluster dataset $DS_i$ for each cluster $C_i$ in the solution $S_{opt}$ using the cluster filter $v_i$, which is associated with cluster $C_i$ against the entire flow dataset F. This is expressed formally as:

$DS_i$=Filter($F,v_i$)

For each cluster-specific flow dataset $DS_i$, the model manager generates a cluster model $M_i$, which is trained on the dataset $DS_i$. This is expressed formally as:

$M_i$=A·fit($DS_i$)

Note that the model manager 124 can generate different cluster model sets by using different anomaly detection algorithms A.

FIG. 3 shows an example of a tree mode in accordance with embodiments. The tree model 300 is an example of a tree model 300 that may be generated according to the process described in relation to FIG. 2. In this example, the tree model 300 represents the clustering hierarchy that can be obtained using the following three clustering features: flow direction, transport layer protocol, and destination port. At the first iteration of the process, the algorithm identifies that to minimize the clustering cost function, the root cluster 302 is to be split into three clusters: local to local flows (denoted by <L2L>), local to remote flows (denoted by <L2R>), and remote to local flows (denoted by <R2L>), using the flow direction feature. Then, when processing the <L2L> cluster, the algorithm identifies that to minimize the clustering cost function, the transport layer protocol feature should be used to split the <L2L> cluster into three clusters: <L2L, TCP>, <L2L, UDP>, and <L2L, Other> (representing local to local flows with different transport layer protocol from TCP or UDP). When processing the <L2L, TCP> cluster, the algorithm identifies that to minimize the clustering cost function, the cluster <L2L, TCP> should be split into four clusters: <L2L, TCP, 53>, <L2L, TCP, 80>, <L2L, TCP, 433>, and <L2L, TCP, Other>. This last layer 304 of the tree model 300 represents the leaf nodes of the tree, for which ML models will be generated. For the sake of clarity, not all of the leaf nodes of the tree model 300 are shown. However, it will be appreciated that the tree model 300 will include additional leaf nodes for each branch of the tree model 300. Additionally, in some cases, depending on the size of the resulting tree model compared to the specified maximum size, the nodes <L2L, TCP, 53>, <L2L, TCP, 80>, <L2L, TCP, 433>, and <L2L, TCP, Other>, could be further split into additional child nodes, which would represents the leaf nodes of the tree model.

Figure 4:
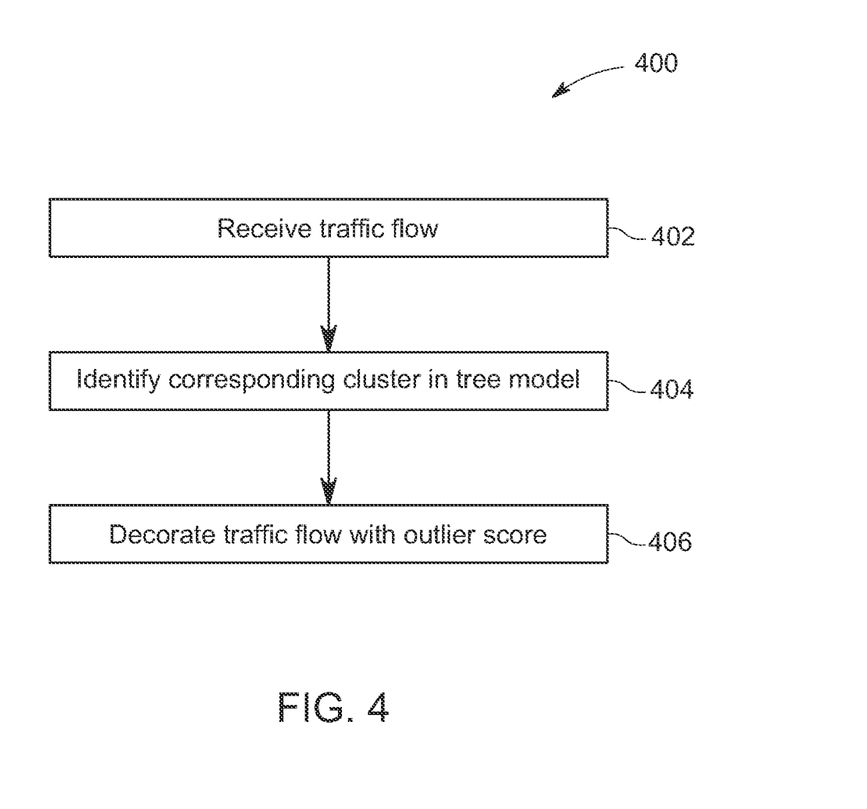
FIG. 4 is a process flow diagram of method for labeling data flows with outlier scores in accordance with embodiments.

FIG. 4 is a process flow diagram of method for labeling data flows with outlier scores in accordance with embodiments. The method 400 may be performed by the model validator 122, and may begin at block 402.

At block 402 a traffic flow f is received by the traffic monitor. This input flow may be received as a stream or as a dataset, and may be formatted in the IPFIX format for example.

At block 404, the cluster corresponding to the traffic flow is identified. The cluster is identified by traversing the tree model T generated by the model manager 120 to find the cluster $C_k$ such that $f \in C_k$ (i.e., the flow f is an element of $C_k$). If no cluster is found, the outlier score s may be set as some predefined maximal outlier score.

At block 406, an outlier score is determined for the flow and the flow is decorated with the outlier score. To determine the outlier score, the ML model $M_k$ corresponding to the cluster $C_k$ is first applied to the flow f to determine the outlier score of flow f in a relation to the cluster $C_k$ baseline. This is expressed formally as:

$$p(f/C_k) = A \cdot \text{predict}(M_k, f)$$

Next, a combined score S(f) is computed for the flow fusing equation 1. Specifically, the combined score is a function of the cluster $C_k$ outlier score $p(C_k)$ and the flow outlier score $p(f/C_k)$ in a relation to the cluster $C_k$ baseline. This is expressed formally as:

$$S(f) = f(p(C_k), p(f/C_k))$$

For example, in the Histogram-Based Outlier Score (HBOS) algorithm, the outlier score is given by the following formula:

$$HBOS(f) = HBOS(C) + HBOS(f/C)$$

In the above equation, HBOS(C) is the HBOS score of cluster C, i.e., HBOS(C)=log(1/hist(C)), and HBOS(f/C) is the HBOS score of flow f given the corresponding cluster model M. In some embodiments, the process performed at block 406 can be repeated using different anomaly detection algorithms A to decorate each flow with a set of two or more outlier scores.

The result of the process is a stream (or set) of flows decorated by flow scores using the tree model T and the set of cluster models $\{M_1, M_2, \ldots, M_n\}$ provided by the model manager. For example, if the flow is in the form of a key-value data structure, decorating the flows may be accomplished by adding additional score attributes to the flow. The decorated flows may then be routed to their target destination through the network. The flow scores may be use in a variety of ways. For example, the flow with the highest outlier score may be displayed to a user such as a security analyst. Additionally, some or all of the decorated flows may be pushed to a rule engine configured to apply rules on the outlier score. Decorated flows may also be pushed to threat detection and investigation analytics tools.

The process flow diagram of FIG. 4 is not intended to indicate that the operations of the method 400 are to be executed in any particular order, or that all of the operations of the method 400 are to be included in every case. Additionally, the method 400 can include additional operations not shown or described.

Figure 5:
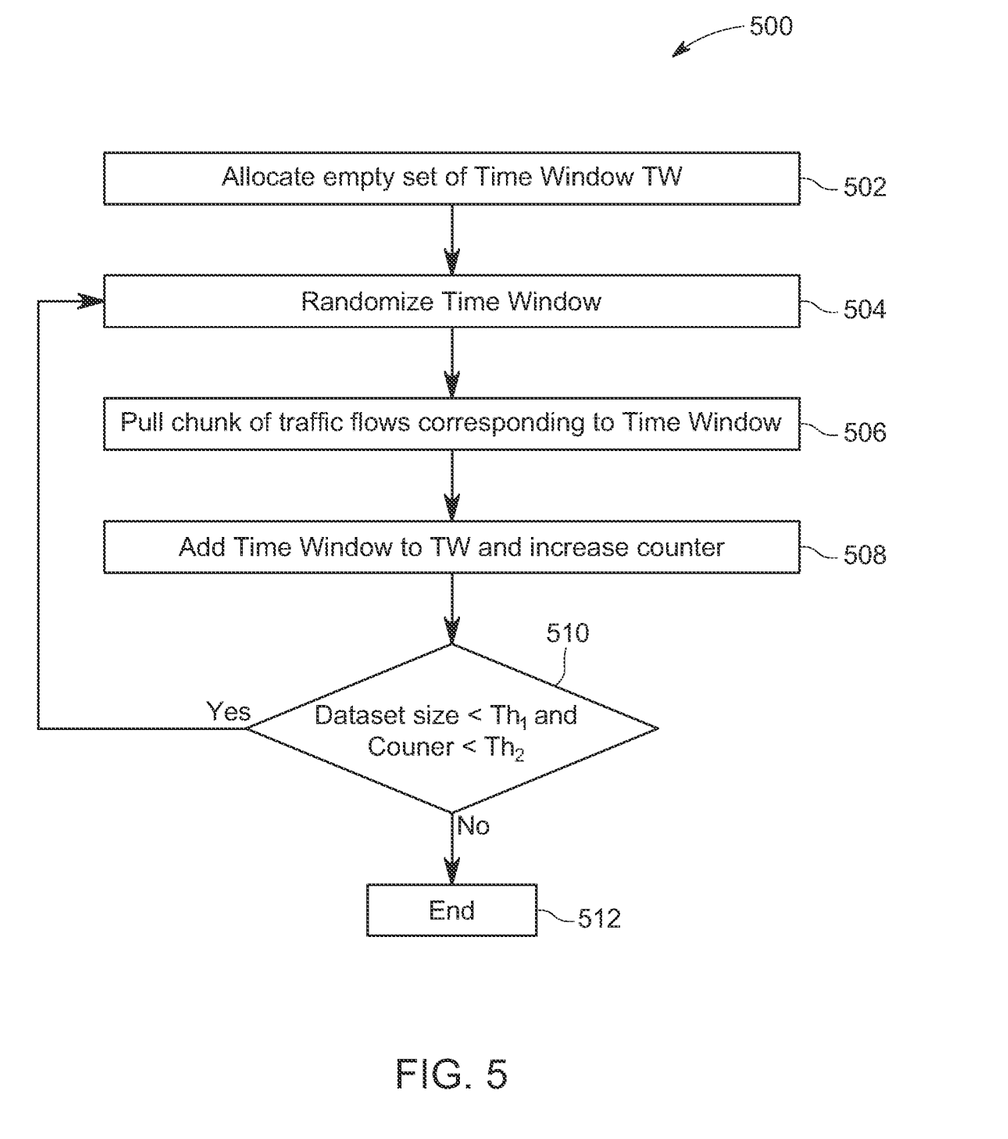
FIG. 5 is a process flow diagram of a method for generating the traffic flow dataset in accordance with embodiments.

FIG. 5 is a process flow diagram of a method for generating the traffic flow dataset in accordance with embodiments. The process may be performed by the dataset generator 124 when generating a new task as described above in relation to block 204 of FIG. 2. In order to achieve an unbiased dataset, the dataset generator 124 is configured to dynamically pull a dataset for each cluster proactively until reaching a specified dataset size or when the number of pulling attempts reaches some predefined limit. When the dataset reaches its specified size a dataset is created that is representative of the network data.

The dataset is pulled from the flow database 128 of FIG. 1, which stores the flow logs of the subject network within a given time frame, denoted by $[t_s, t_e]$. The flow database 128 supports the query pull(v, $t_0$, $t_1$), which returns all flows in the flow database that satisfy the filter v within the time widow between $t_0$ and $t_1$. Input to the process includes the cluster filter $v_i$ of the relevant cluster, the target dataset size $Th_1$, and the specified maximum number of pulling attempts $Th_2$. The output of the process includes the traffic flow dataset $DS_i$, which contains a sufficient dataset for cluster $C_i$. The method begins at block 502.

At block 502, the process is initialized by allocating an empty time window set TW for tracking the time windows. The time window set TW is used to track which time windows have been queried for generating the dataset $DS_i$, which is the dataset for cluster i.

At block 504, the time window is randomized. Specifically, a time window tw=$\{t_0, t_1\}$ is specified for random values of $t_0$ and $t_1$. The values $t_0$ and $t_1$ may be any values laying between $t_s$ and $t_0$ which do not overlap any of the time windows previously stored in TW.

At block 506, a new chunk of traffic flows corresponding to relevant cluster filter $v_i$ the time window generated at block 504 are pulled from the flow database. The new chunk of flows are added to the dataset $DS_i$. This is expressed formally as:

$$DS_i \leftarrow DS_i \cup \text{pull}(v_i, t_0, t_1)$$

At block 508, the time window generated at block 504 is added to the time window set, and the iteration counter is incremented by one.

At block 510, a determination is made regarding whether the size of the dataset $|DS_i|$ is less than the threshold size $Th_1$ and whether the iteration counter is less than the threshold number of iterations $Th_2$. If both conditions are true, then the process returns to block 504, and a new iteration of the process is executed, i.e., a new time window is generated and a new chunk of flows is added to the dataset. Otherwise, the process flow advances to block 512 and the process ends. The new dataset $DS_1$ is returned and can be used by the model manager 120 as described above in relation to FIG. 2.

The process flow diagram of FIG. 5 is not intended to indicate that the operations of the method 500 are to be executed in any particular order, or that all of the operations of the method 500 are to be included in every case. Additionally, the method 500 can include additional operations not shown or described.

Figure 6:
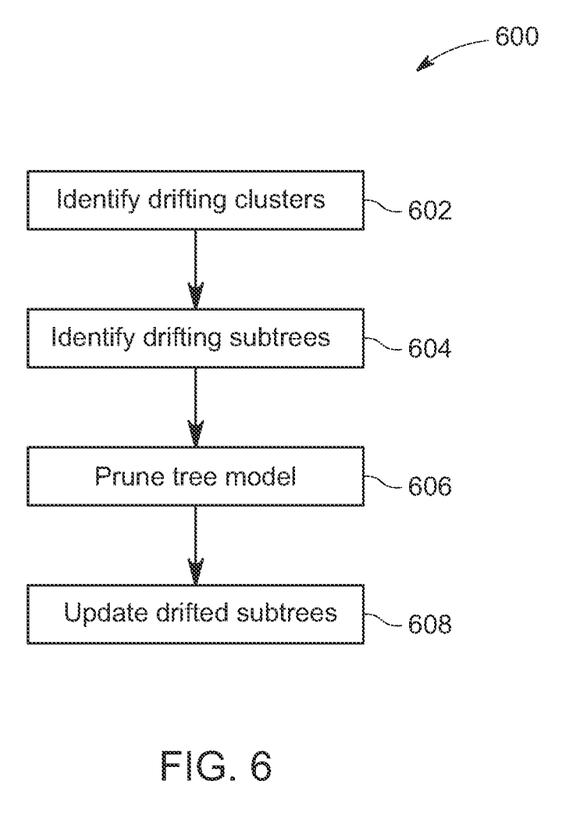
FIG. 6 is a process flow diagram of a method for updating the network model in accordance with embodiments.

FIG. 6 is a process flow diagram of a method for updating the network model in accordance with embodiments. The process may be performed by the model updater 126 to ensure that the network model is able to continue making accurate predictions over time. To achieve this, the data that it is being used by the model validator to make predictions should have a similar distribution as the data on which the model was trained. However, the network dynamic is continuously changing, and hence the network traffic's feature distributions will drift over time. Accordingly, the method 600 can be used to update the tree model and the ML cluster models continuously over time to adjust to network changes.

The model update method 600 described herein relies on access to the flow database 128 (FIG. 1) which stores network flows, decorated by the outlier scores, within a given time frame, denoted by $[t_s, t_e]$. The flow database supports the query count(v, Th, $t_0$, $t_1$) which returns the number of flows in the flow database that satisfies the following conditions: (1) the flow corresponds with the specified filter v, (2) the flow's outlier score is above the specified threshold Th, and (3) the flow timestamp is in a time window between $t_0$ and $t_1$. In the following description, error flows are defined as a percentage x of flows with the highest outlier score, and Th is the threshold for delimiting between error flows and all other flows. The method begins at block 602.

At block 602, drifting clusters are identified. To identify drifting clusters, each cluster (i.e., tree leaf) is decorated with a flow rate and an error flow estimation. For this propose, the queries count(v, 0, $t_0$, $t_1$) and count(v, Th, $t_0$, $t_1$) can be used to estimate the flow rate and the error flow rate of cluster C, with filter v, at time window $[t_0, t_1]$. Several time windows can be used in order to achieve an accurate cluster flow rate and cluster error flow rate estimation. Then, each cluster is decorated with a drifting score using the following equation:

$$\text{drift\_score} = \frac{\text{error\_flow\_rate}}{\text{expected\_error\_flow\_rate}} \quad \text{(eq. 4)}$$

In the above, equation the expected error flow is given by the cluster's flow rate multiplied by the error percentile x.

At block 604, drifting subtrees are identified. To identify drifting subtrees, the flow rate and error flow rate of each node in the clustering tree T is set in a bottom-up process. Specifically, the flow rate of a parent node is set as the sum of its children's flow rate and the error flow rate of a parent node is set as the sum of its children's error flow rate. After setting the flow rate and error flow rate of each node, a drifting score of each node in the clustering tree T is set using equation 4.

At block 606, the tree model T is pruned using a bottom-up tree pruning process based on the nodes' drifting scores. Specifically, the tree is pruned at a node n if the drifting score of this node is above a given threshold.

At block 606, the most drifted sub-trees are updated. To update drifted subtrees, the clustering algorithm described above in relation to FIG. 2 is performed with a modified initialization stage. Instead of initialization the task queue Q with a single task representing the entire dataset, a new task is pushed into the task queue Q for each subtree pruned at block 606. The cluster filter, the set U, and the cluster priority for each new task is set using the pruned tree node's corresponding attributes. If there are two or more tasks that have a relation of parent-child, only the task related to the parent is pushed and the child is disregarded since updating the parent also updates the child. Once the queue is populated with the pruned subtrees, the same processing described above for blocks 204-220 of FIG. 2 is performed and all of the drifted sub-trees are rebuilt according to the new dataset, resulting in an updated tree model T.

The process flow diagram of FIG. 6 is not intended to indicate that the operations of the method 600 are to be executed in any particular order, or that all of the operations of the method 600 are to be included in every case. Additionally, the method 600 can include additional operations not shown or described.

Figure 7:
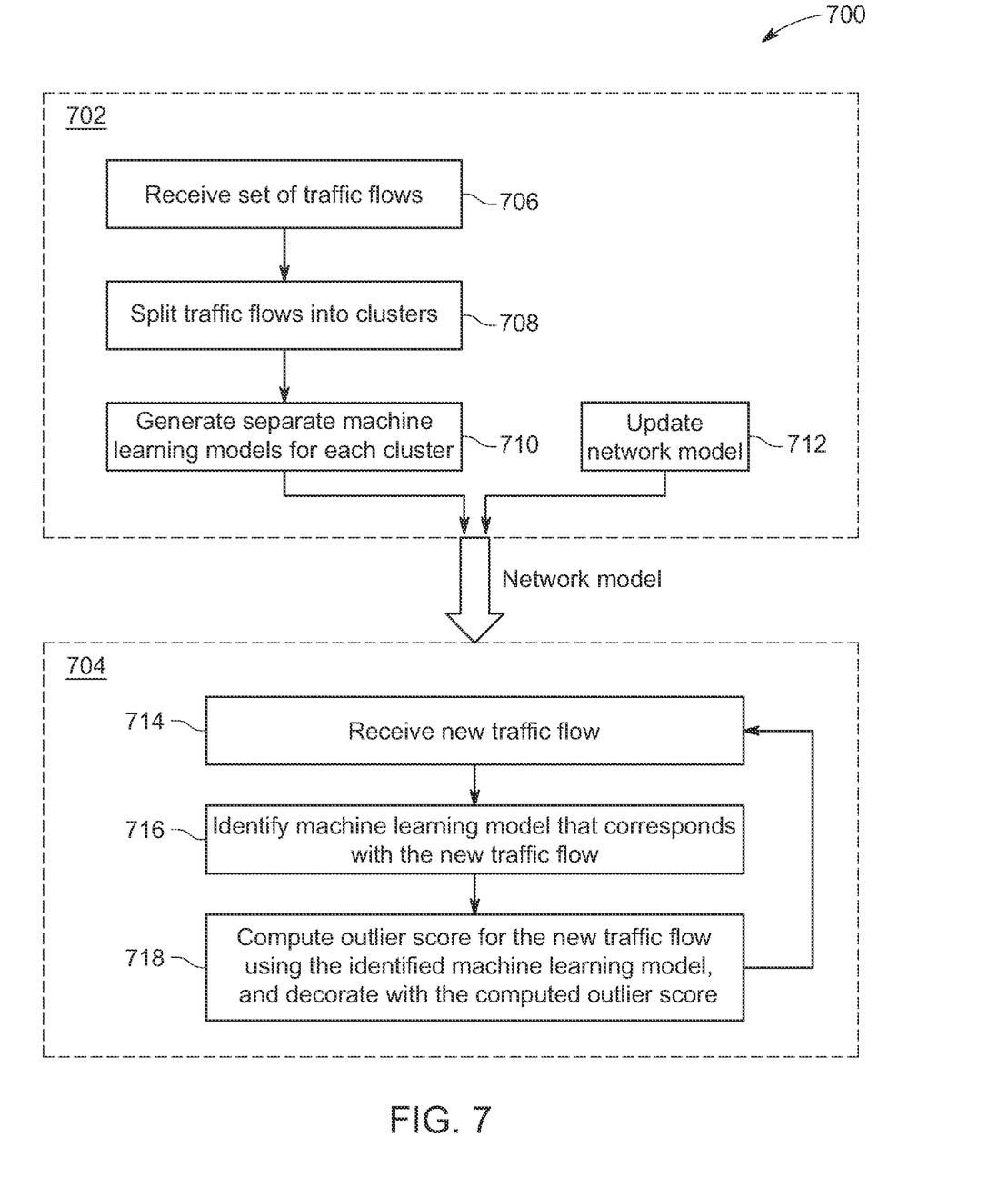
FIG. 7 is a process flow diagram summarizing a method of decorating network traffic flows with outlier scores in accordance with embodiments.

FIG. 7 is a process flow diagram summarizing a method of decorating network traffic flows with outlier scores in accordance with embodiments. The process may be performed by the network monitor 102 of FIG. 1. The process includes two phases: a training phase 702 and a validation phase 704. During the training phase 702, which may be performed by the model manager 120, the network model is generated, including the tree model and the ML models for the clusters (i.e., leaf nodes of the tree model). During the validation phase, which may be performed by the model validator 122, the network model is used to decorate traffic flows. The process may begin at block 706.

At block 706, a set of traffic flows is received from a memory device. The memory device may be the flow database or some other volatile or non-volatile electronic memory for storing data. The set of traffic flows may be streamed from the network or pulled from the flow database through queries, for example. In some examples, the set of traffic flows may be received as described above in relation to FIG. 5.

At block 708, the traffic flows are split into clusters of traffic flows. The clusters may be generated as described above in relation to FIG. 2. Each cluster is a non-overlapping cluster of traffic flows that corresponds with a leaf of the tree model.

At block 710, machine learning models are generated for each of the clusters of traffic flows separately. The machine learning models may be generated by training the model on a set of traffic flows using any suitable machine learning method. The set of flows on which the model is trained may be a flow dataset generated in accordance with the process described above in relation to FIG. 5.

At block 712, the network model may be updated. The network model may be updated as described above in relation to FIG. 6. The model update process 712 may be performed after the initial network model is generated, and may be performed in a continuous loop to identify and update drifting subtrees of the network model.

The network model generated during the training phase may be stored to memory and used during the validation phase, which begins at block 714. Additionally, new network models will be available to the validation phase as they are updated at block 712.

At block 714, a new traffic flow is received. The new traffic flow may be received from the flow database or streamed directly from a component of the network being monitored.

At block 716, the machine learning model that corresponds with the new traffic flow is identified. For example, the machine learning model may be identified by traversing the tree model according to the features of the new traffic flow to identify the corresponding cluster (i.e., leaf node of the tree).

At block 718, an outlier score is computed for the new traffic flow using the identified machine learning model, and the new traffic flow is decorated with the computed outlier score. The process flow may then return to block 714 so that additional flows of network traffic can be decorated as they are received.

The process flow diagram of FIG. 7 is not intended to indicate that the operations of the method 700 are to be executed in any particular order, or that all of the operations of the method 700 are to be included in every case. Additionally, the method 700 can include additional operations not shown or described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for decorating network traffic flows with outlier scores to detect anomalies, comprising:
   a memory device to store traffic flows received from a network; and
   a processor to:
   receive a set of traffic flows from the memory device;
   generate a tree model to split the traffic flows into clusters of traffic flows, wherein each cluster corresponds with a leaf of the tree model;
   generate machine learning models for each of the clusters of traffic flows separately;
   continuously update the tree model and the machine learning models to adjust to network changes, wherein to update the tree model, the processor is to:
   identify a subtree of the tree model as a drifting subtree;
   prune the subtree; and
   add a new task to a task queue for the pruned subtree, wherein the processor is to process the task to generate new child nodes using a new flow dataset pulled from the memory; and
   for a new traffic flow, identify a specific one of the machine learning models that corresponds with the new traffic flow, compute an outlier score for the new traffic flow using the identified specific one of the machine learning models, and decorate the new traffic flow with the outlier score.

2. The system of claim 1, wherein to split the traffic flows into clusters of traffic flows, the processor is configured to apply a categorical filter to a set of features of the traffic flows.

3. The system of claim 1, wherein to split the traffic flows into clusters of traffic flows, the processor is configured to:
   for a node of the tree model, add new child nodes to the tree model based on an optimal split of a cluster corresponding to the node;
   wherein the optimal split of the cluster is one that minimizes a cost function among any valid split of any unset feature of the cluster.

4. The system of claim 3, wherein to split the traffic flows into clusters of traffic flows, the processor is configured to:
   generate a task queue; and
   add a new task to the task queue for each of the new child nodes, wherein the new task comprises a cluster filter associated with the child node, a set of the unset cluster features, and a task priority.

5. The system of claim 1, wherein to generate the tree model, the processor is to generate a flow dataset for each cluster, wherein to generate the flow dataset the processor is to:
   randomize a time window;
   pull a chunk of flows from the memory using the randomized time window and a cluster filter associated with the cluster; and
   add the chunk of flows to the flow dataset.

6. The system of claim 1, wherein to identify the drifting subtree, the processor is configured to:
   compute a flow rate and an error flow rate for each leaf node of the tree model;
   compute a node flow rate and node error flow rate for each parent node of the tree model by adding the flow rates and error flow rates of its children; and
   compute a drift score for each parent node of the tree model based on the node flow rates and node error flow rates;
   wherein the tree model is pruned at any node with a drift score above a specified threshold.

7. A method of decorating network traffic flows with outlier scores to detect anomalies, comprising:
   receiving a set of traffic flows from a memory device;
   generating a tree model to split the traffic flows into clusters of traffic flows, wherein each cluster corresponds with a leaf of the tree model;
   generating machine learning models for each of the clusters of traffic flows separately;
   continuously updating the tree model and the machine learning models to adjust to network changes, wherein updating the tree model comprises:
   identifying a subtree of the tree model as a drifting subtree;
   pruning the subtree; and
   adding a new task to a task queue for the pruned subtree, wherein the processor is to process the task to generate new child nodes using a new flow dataset pulled from the memory; and
   for a new traffic flow, identifying a specific one of the machine learning models that corresponds with the new traffic flow, compute an outlier score for the new traffic flow using the identified specific one of the machine learning models, and decorate the new traffic flow with the outlier score.

8. The method of claim 7, wherein splitting the traffic flows into clusters of traffic flows comprises applying a categorical filter to a set of features of the traffic flows.

9. The method of claim 7, wherein splitting the traffic flows into clusters of traffic flows, comprises:

for a node of the tree model, adding new child nodes to the tree model based on an optimal split of a cluster corresponding to the node;

wherein the optimal split of the cluster is one that minimizes a cost function among any valid split of any unset feature of the cluster.

10. The method of claim 9, wherein splitting the traffic flows into clusters of traffic flows comprises generating a task queue; and adding a new task to the task queue for each of the new child nodes, wherein the new task comprises a cluster filter associated with the child node, a set of the unset cluster features, and a task priority.

11. The method of claim 7, wherein generating the tree model comprises generating a flow dataset for each cluster, wherein generating the flow dataset comprises:

randomizing a time window;

pulling a chunk of flows from the memory using the randomized time window and a cluster filter associated with the cluster; and adding the chunk of flows to the flow dataset.

12. The method of claim 7, wherein identifying the subtree of the tree model as a drifting subtree comprises:

computing a flow rate and an error flow rate for each leaf node of the tree model;

computing a node flow rate and node error flow rate for each parent node of the tree model by adding the flow rates and error flow rates of its children; and computing a drift score for each parent node of the tree model based on the node flow rates and node error flow rates;

wherein the tree model is pruned at any node with a drift score above a specified threshold.

13. A computer program product for detecting anomalous network traffic flows comprising a computer readable storage medium having program instructions embodied therewith, wherein the computer readable storage medium is not a transitory signal per se, and wherein the program instructions are executable by a processor to cause the processor to:

receive a set of traffic flows;

generate a tree model to split the traffic flows into clusters of traffic flows, wherein each cluster corresponds with a leaf of the tree model;

generate machine learning models for each of the clusters of traffic flows separately;

continuously update the tree model and the machine learning models to adjust to network changes, wherein to update the tree model, the instructions cause the processor to:

identify a subtree of the tree model as a drifting subtree;

prune the subtree; and add a new task to a task queue for the pruned subtree, wherein the processor is to process the task to generate new child nodes using a new flow dataset pulled from the memory; and for a new traffic flow, identify a specific one of the machine learning models that corresponds with the new traffic flow, compute an outlier score for the new traffic flow using the identified specific one of the machine learning models, and decorate the new traffic flow with the outlier score.

14. The computer program product of claim 13, wherein to split the traffic flows into clusters of traffic flows, the instructions cause the processor to apply a categorical filter to a set of features of the traffic flows.

15. The computer program product of claim 13, wherein to split the traffic flows into clusters of traffic flows, the instructions cause the processor to:

for a node of the tree model, add new child nodes to the tree model based on an optimal split of a cluster corresponding to the node;

wherein the optimal split of the cluster is one that minimizes a cost function among any valid split of any unset feature of the cluster.

16. The computer program product of claim 15, wherein to split the traffic flows into clusters of traffic flows, the instructions cause the processor to:

generate a task queue; and add a new task to the task queue for each of the new child nodes, wherein the new task comprises a cluster filter associated with the child node, a set of the unset cluster features, and a task priority.

17. The computer program product of claim 13, wherein to generate the tree model, the instructions cause the processor to generate a flow dataset for each cluster, wherein to generate the flow dataset the processor is to:

randomize a time window;

pull a chunk of flows from the memory using the randomized time window and a cluster filter associated with the cluster; and add the chunk of flows to the flow dataset.

\* \* \* \* \*